United States Patent [19]

Kadoya et al.

[11] Patent Number: 5,273,560
[45] Date of Patent: Dec. 28, 1993

[54] FILTER ELEMENT AND METHOD FOR PRODUCING THE SAME

[75] Inventors: Teruichi Kadoya; Hiromi Ohta, both of Hamakita; Tadayuki Onoda, Iwata, all of Japan

[73] Assignee: Toyo Roki Seizo Kabushiki Kaisha, Japan

[21] Appl. No.: 837,322

[22] Filed: Feb. 18, 1992

[30] Foreign Application Priority Data

| Feb. 19, 1991 | [JP] | Japan | 3-007006[U] |
| Feb. 19, 1991 | [JP] | Japan | 3-007007[U] |
| Apr. 8, 1991 | [JP] | Japan | 3-074939 |

[51] Int. Cl.⁵ .................. B01D 27/06; B01D 29/07
[52] U.S. Cl. ......................... 55/498; 55/521; 55/DIG. 5; 210/493.2; 210/493.5; 493/941
[58] Field of Search .................. 55/497–500, 55/521, DIG. 5; 210/493.1, 493.2, 493.3, 493.5; 493/941

[56] References Cited

U.S. PATENT DOCUMENTS

| 2,032,262 | 2/1936 | Cori | 55/497 |
| 3,296,781 | 1/1967 | Schumann | 55/497 |
| 3,490,211 | 1/1970 | Cartier | 55/497 X |
| 3,695,012 | 10/1972 | Rolland | 55/521 X |
| 3,800,512 | 4/1974 | Tanner | 55/497 X |
| 3,815,754 | 6/1974 | Rosenberg | 55/497 X |
| 3,853,529 | 12/1974 | Boothe et al. | 55/499 |
| 3,869,392 | 3/1975 | Wolf | 55/521 X |
| 4,056,376 | 11/1977 | Schuldenfrei | 55/497 |
| 4,187,182 | 2/1980 | Rosenberg | 55/497 X |
| 4,462,399 | 7/1984 | Braun | 55/497 X |
| 4,685,944 | 8/1987 | Allan et al. | 55/521 X |
| 4,885,015 | 12/1989 | Goulet et al. | 55/497 |
| 4,925,561 | 5/1990 | Ishii et al. | 55/497 X |
| 4,976,857 | 12/1990 | Solomon | 55/498 X |

FOREIGN PATENT DOCUMENTS

| 61-200122 | 12/1986 | Japan . |
| 01-075021 | 3/1989 | Japan | 55/497 |
| 2150461 | 7/1985 | United Kingdom | 55/497 |

Primary Examiner—Robert Spitzer
Attorney, Agent, or Firm—Ladas & Parry

[57] ABSTRACT

A filter element and a method for manufacturing the filter element is disclosed wherein filter paper is folded in a zigzag manner to form a filter material, and a circumferential portion of the filter material is fastened by an adhesive so as to fasten the zigzag filter material and to divide the filter material into a dust side and a clean side. Thus, the structure of the filter element is simplified and a filter performance is enhanced.

12 Claims, 22 Drawing Sheets

F I G. 7
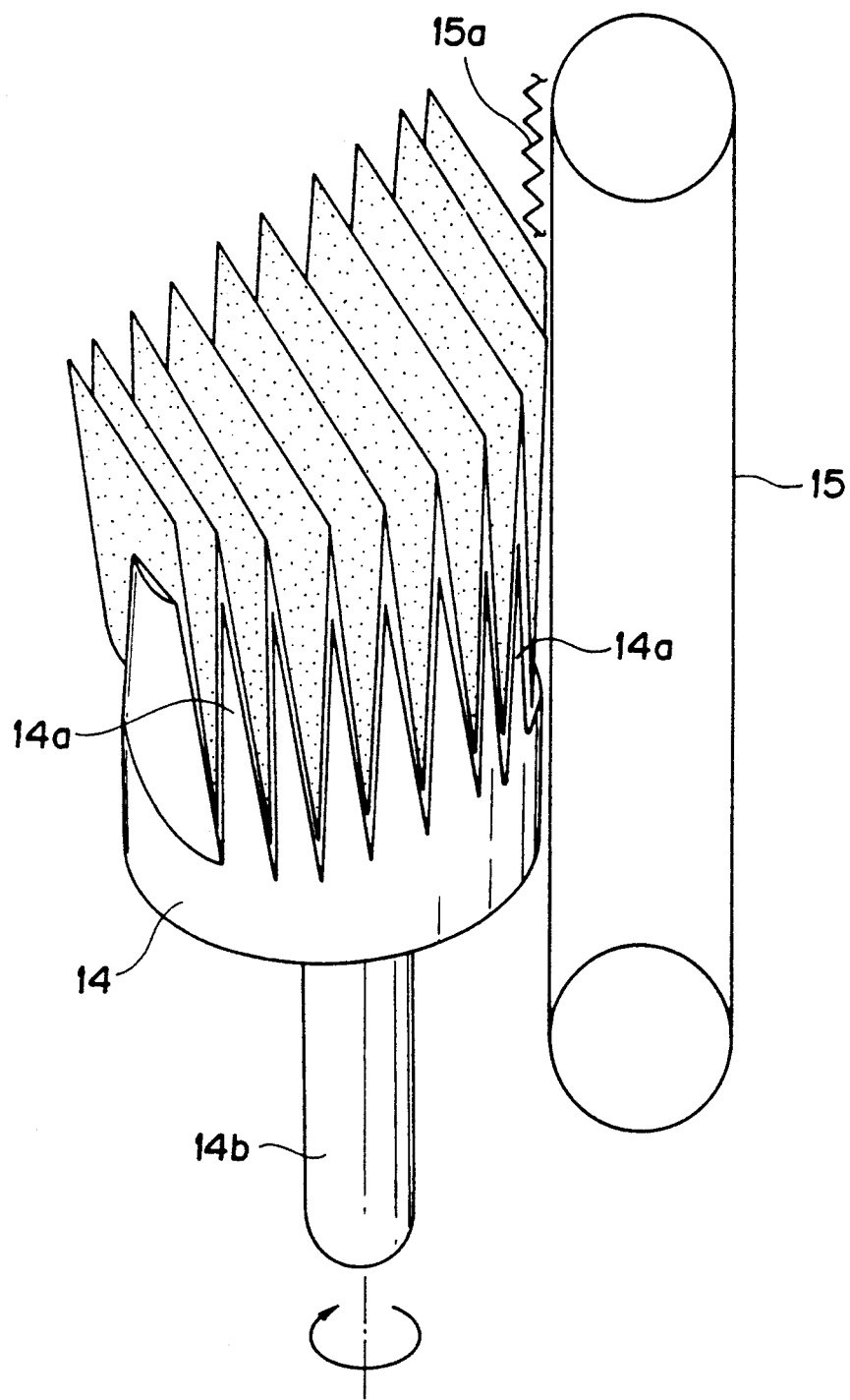

FILTER ELEMENT AND METHOD FOR PRODUCING THE SAME

FIELD OF THE INVENTION

The present invention relates to a filter element used for filtration of fuel, oil, gas or the like and also relates to a method for producing the same.

In general, a filter element is mounted within a case and placed in a predetermined position in an engine or the like for filtrating fuel, oil or the like.

For instance, Japanese Utility Model Application Laid Open No. 61-200122 discloses a conventional filter element. The filter element is composed of an element body which is made by continuously folding a filter material in a zigzag manner and an annular support plate having a number of mountain-like closed projections for clogging a wave shaped end face opening of the filter material. The annular-shaped support plate is bonded and fixed to the case of the filter assembly.

However, in the conventional filter element, spaces between the zigzag portions of the filter material and a large number of the mountain-like closed projections of the annular support plate are filled with adhesives for bonding the filter material to the support plate. Thus, the annular support plate must be prepared. For this reason, the number of the mechanical parts is increased, and the structure of the filter element would be complicated. Also, since the mountain-like closed projections are inserted into respective zigzag bent portions of the filter material, a pitch of the zigzag shape is increased resulting in degradation in filter performance.

In the conventional filter element, since adhesives are applied between the zigzag portions of the element body and many mountain-like closed projections of the annular support plate to fix both components to each other, there is another problem that the adhesives flow out of the bonded portions to adhere to a surface of the filter material, thus decreasing the effective filtrating area.

In addition, since each groove of the element body is deep, it would be difficult to apply the adhesives thereto, and the assembling work would be complicated.

Furthermore, since a ring which is a connection member for fixing the filter element to the case of the filter assembly is formed integrally with a fastening member, the structure would become complicated.

Finally, during the production of the conventional filter element, it is necessary to perform a troublesome operation such that the zigzag filter material is inserted into spaces between the respective mountain-like closed projections. As a result, the assembling work is complicated to degrade the production efficiency.

SUMMARY OF THE INVENTION

Accordingly to overcome the above noted defects inherent in the prior art, according to the present invention, there is provided a filter element in which zigzag end portions of a filter element folded in a zigzag manner are sealed with adhesive to thereby divide the filter material into a dust side and a clean side.

According to the invention, in a filter element having a filter material folded in a zigzag manner, and a circumferential wall for fastening an outer periphery of the filter material, the circumferencial wall is made of an adhesive or injection molded resin, and the circumferential edge of the filter material is held in the wall.

A coupling member for coupling the fastening member to a case of a filter unit, may be provided, and the peripheral edge portion of the filter material and the base portion of the coupling member are embedded in the wall.

According to a method for producing a filter element, the filter material is folded in a zigzag manner, and subsequently zigzag end portions of the filter material are sealed with adhesive to thereby divide the filter material into a dust side and a clean side.

According to another method for producing a filter element, adhesive is applied to both end portions of a sheet-like filter material, and subsequently the filter material is folded in a zigzag manner so that the zigzag end portions are sealed with the adhesive to thereby divide the filter material into a dust side and a clean side.

In the filter element according to the invention, a pitch of the zigzag folds of the filter material is small to thereby enhance the filter performance. Also, it is unnecessary to use a ring-like support plate and it is possible to simplify the structure of the filter element. The fastening member is made of injection-molded resin kept under a molten state, and the fastening member in the molten state is adhered to the filter material. It is therefore possible to dispense with another adhesive for coupling the fastening member and the filter material. Accordingly, there is no fear that an excessive adhesive would adhere to the surface of the filter material. Since the fastening member and the filter material are simultaneously formed integrally with each other, it is possible to simplify the assembling work. The peripheral edge of the filter material and the base portion of the coupling member are embedded into a wall of the fastening member during the molten state of the fastening member. Accordingly, without using any other adhesive, it is possible to couple into one piece three components, i.e., the fastening member, the filter element and the coupling member. Accordingly, there is no fear that the surface of the filter material would be contaminated with adhesive. It is also possible to simplify the assembling work. Also, since it is possible to separately produce the coupling member and the fastening member, it is possible to readily produce the coupling member.

According to a method for producing a filter element, it is sufficient to apply the adhesive to the zigzag end portions of the zigzag folded filter material. Accordingly, it is easy to perform the assembling work and to divide the filter material into the dust side and the clean side.

According to another method for producing a filter element, the filter material to which the adhesive has been applied is folded into a zigzag manner to thereby assemble the filter element. Accordingly, it is easy to fabricate the filter element, and the adhesion becomes stable. It is also easy to separate the filter element into a dust side and a clean side.

BRIEF DESCRIPTION OF THE DRAWINGS

In the accompanying drawings:

FIG. 7 is a perspective view illustrating a trimming step of the filter material performed after the steps shown in FIG. 6;

DESCRIPTION OF THE PREFERRED EMBODIMENTS

The present invention will now be described in accordance with the following embodiments in conjunction with the accompanying drawings.

Embodiment 1

As shown in FIGS. 1 through 4, a filter element 1 according to the invention includes a filter material 2 made by folding filter paper in a zigzag manner and a circumferential wall 3 which is composed of adhesives for surrounding and fixing a circumference of the filter material 2.

Figure 8:
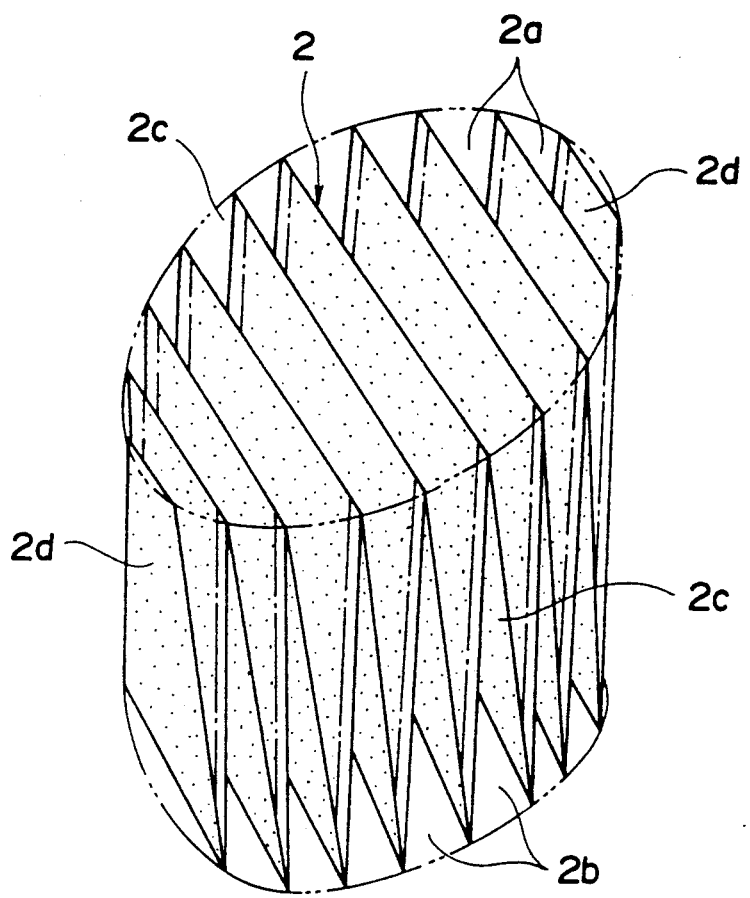
FIG. 8 is a perspective view showing the filter material obtained through the trimming step shown in FIG. 7.

In assembling the filter material 2, as shown in FIG. 8, a sheet having gradually decreased width toward both ends thereof is folded in a zigzag manner in a direction perpendicular to its longitudinal direction so that the overall shape is in the form of a cylinder with slight spaces being formed in the folded portions.

Many grooves $2a$ and $2b$ are formed on the top and bottom sides of the filter material 2. In this case, an upper surface serves as a dust side toward which contaminated oil or the like flows, whereas a lower surface serves as a clean side from which the filtered oil flows out.

For instance, the filter material 2 is made of filter paper composed of 70% linter, 20% rayon and 10% pulp with a thickness of 0.65 mm, a weight per square area of 180 g/m$^2$, and permeability of 4.0 sec/$\phi$mm·300 cc.

The circumferential wall 3 is in the form of a cylinder with a flange portion $3a$ at its upper end. As described later in more detail, the flange portion $3a$ is used for securing the filter element to a case of an oil filter.

Incidentally, in the case where the flanged portion $3a$ may be dispersed with in supporting the filter material 2 in place, it is possible to omit the flange portion $3a$.

The circumferential wall 3 is integrally formed of hot melt adhesives which are composed mainly of polyester resin having a specific weight of 1.27, a softening point of 189° C. and a melting viscosity of 1,400 poise (200° C.).

Additionally, it is possible to use thermo-setting or thermoplastic epoxy system resin as adhesive.

The circumferential wall 3 made of adhesives is used to surround the circumference of the filter material 2. The end portions 2c of the filter material 2 indicated by the one dot and dash line in FIG. 8 are embedded into the circumferential wall 3 and opposite end portions 2d are adhered to the inner surfaces of the circumferential wall 3.

Thus, the filter material 2 fixed to the circumferential wall 3 is disposed in a zigzag manner up and down along a center line of the circumferential wall 3.

A method for producing the above described filter element 1 will now be described.

Figure 6:
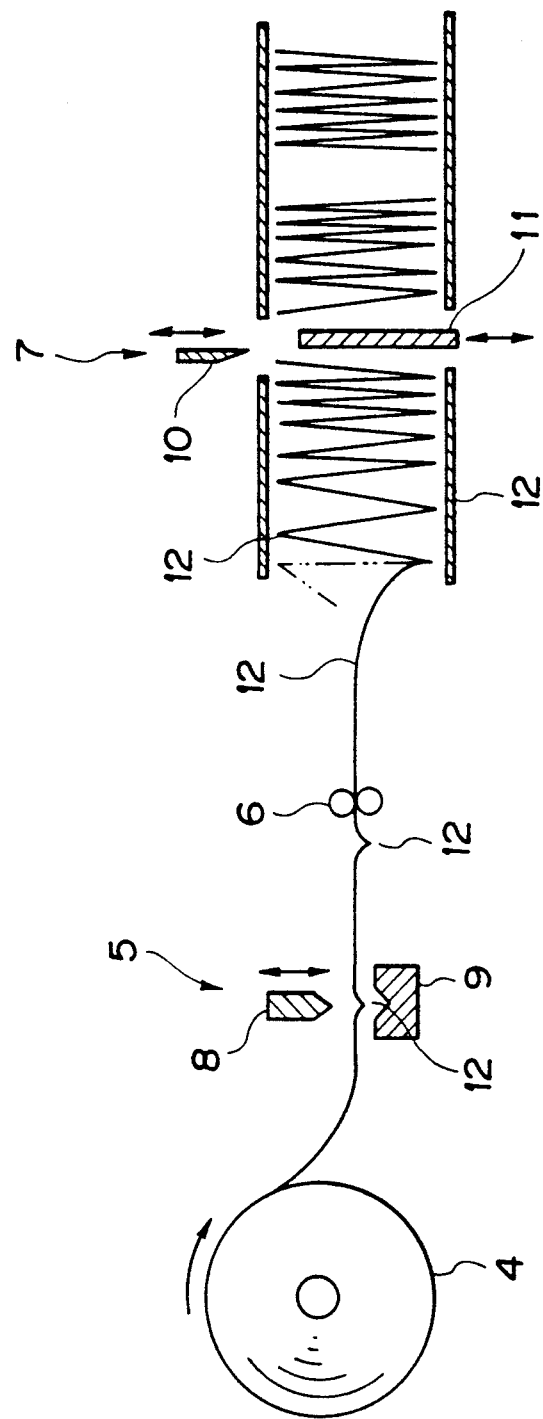
FIG. 6 is an illustration showing an initial half portion of a filter element producing method for producing the element shown in FIGS. 1 to 4.

As shown in FIG. 6, a roll 4 of continuous filter paper, folding line imparting dies 5, pressure rollers 6 and a cutter 7 are arranged in one direction in this order. The continuous filter material is processed in the form of a zigzag shape through the dies 5, the pressure rollers 6 and the cutter 7. The folding line imparting dies 5 are composed of a male die 8 having a wedge shaped cross-section disposed so as to traverse the continuous filter material, and a female die 9 having a recess portion corresponding to the shape of the male die 8. It is possible to change a folded segment 12 as desired by adjusting feeding speed of the filter paper.

The pressure rollers 6 are composed of two upper and lower rollers. The pressure rollers 6 make it possible to clamp the filter paper, which has been folded in a wave shape with the folding lines 12, from above and below, thereby flattening the filter paper. The filter paper is folded in the zigzag manner at the folding lines 12 while being forcibly fed toward the right by the pressure rollers 6.

The cutter 7 includes a cutter blade 10 and an abutment plate 11 which are disposed so as to clamp therebetween the zigzag filter plate. The cutter blade 10 and the abutment plate 11 are both moved up and down so as to cut the zigzag filter paper at a predetermined interval.

The filter material is drawn from the roll 4 by a driving unit (not shown) and is fed at a constant speed. Then, the dies 5 are operated to impart the folding lines to the filter paper in the same direction at a constant interval. The filter paper is again flattened in the horizontal plane by the pressure rollers 6. It is however noted that the folding lines are not eliminated by this operation.

The filter paper which has been provided with the folding lines 12 is fed toward the right by the pressure rollers 6, and is folded in the zigzag manner at the folding lines to be forcibly fed to the cutter 7.

The cutter 7 serves to cut the filter paper, which has been fed in the zigzag manner, at a constant interval and to discharge the filter paper. At this time, the zigzag filter paper as a whole is in the form of a parallelepiped shape.

Subsequently, as shown in FIG. 7, the filter paper folded in the zigzag shape is mounted on a jig 14. Then, the jig 14 is rotated and at the same time, the circumferential portion of the filter paper is trimmed or cut by a band saw 15 with a blade 15a or a cutter.

The jig 14 has comb-shaped teeth 14a which are formed by providing a number of slits from one end face to the other end face of the cylinder in the axial direction. The zigzag filter paper may be inserted between the respective teeth 14a. The jig 14 is supported by a vertical shaft 14b and is rotated horizontally by a motor (not shown).

Thus, the filter material 2 having a cylindrical contour is obtained as shown in FIG. 8.

Figure 9:
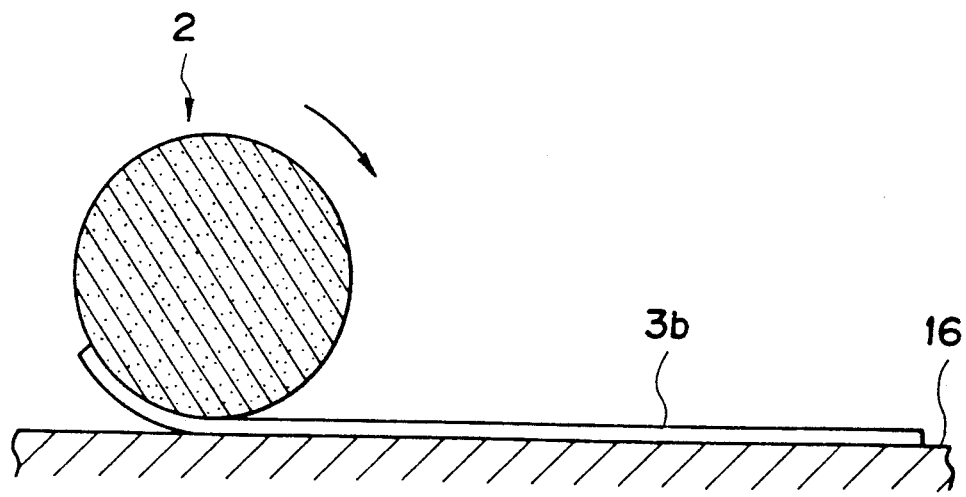
FIG. 9 is a side elevational view showing the adhesion step performed after the step shown in FIG. 7.

Subsequently, as shown in FIG. 9, a sheet 3b made of hot melt adhesive is laid on a horizontal heating plate 16 to thereby soften the sheet. Preferably, a thickness of the sheet 3b made of hot melt adhesive is about 1 mm.

When the hot melt adhesive sheet 3b is softened, the cylindrical filter material 2 is rolled on the sheet, and zigzag edges 2c are sealed by hot melt adhesive.

While the hot melt adhesive is being softened, portions of the filter material extruding from the cylindrical shape toward the upper side are pushed against a planar plate to thereby form a flange 3a. Thus, the filter element 1 is obtained.

Figure 43:
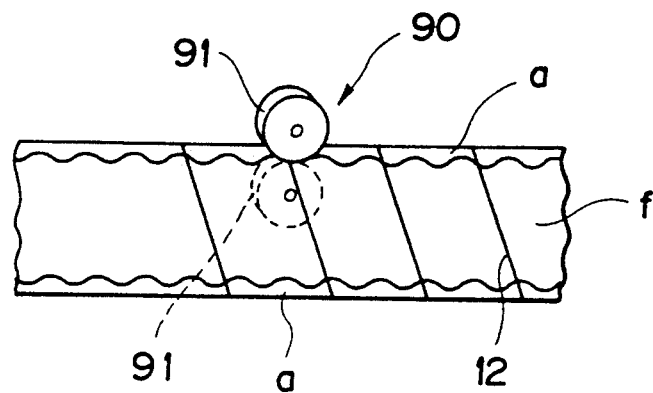
FIG. 43 is a perspective view showing a state wherein an adhesive is applied to both side edges of a filter material.

In another manufacture method, a filter material f obtained through the steps shown in FIG. 6 is, as shown in FIG. 43, flattened and adhesives a are applied to both the ends thereof by an adhesive applying means 90 such as a pair of sponge rollers 91. Thereafter, the filter material f is folded again in a zigzag shape and is sealed with adhesives to thereby produce the filter material 2. The thus obtained filter material 2 is separated into the dust side and the clean side.

Figure 1:
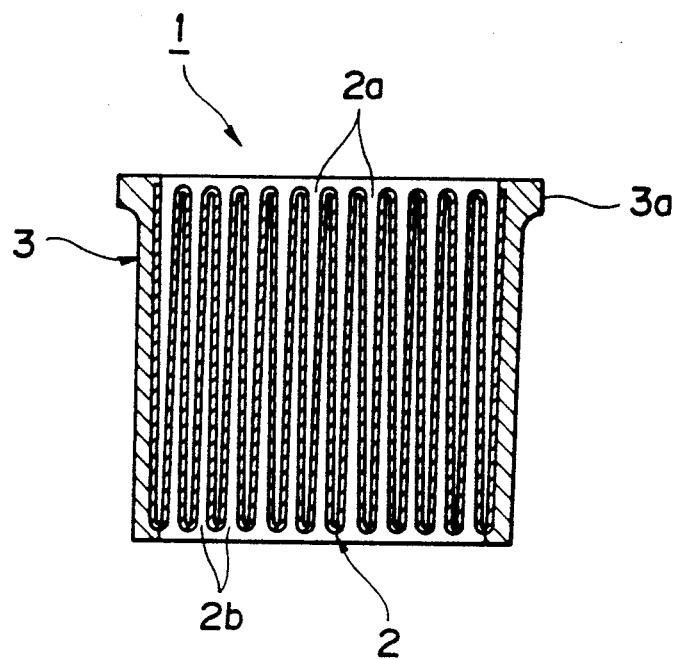
FIG. 1 is a cross sectional view, taken along the line I—I of FIG. 2, showing a first embodiment of a filter element according to the invention.
Figure 2:
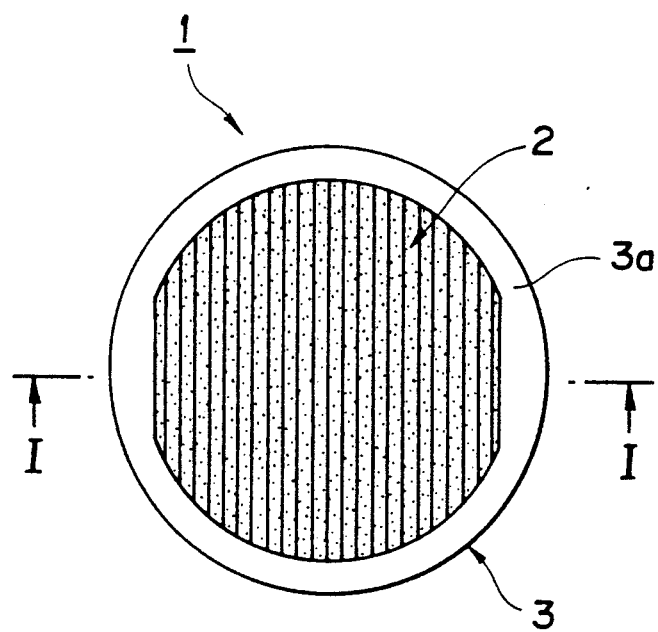
FIG. 2 is a plan view showing the filter element of the invention shown in FIG. 1.
Figure 3:
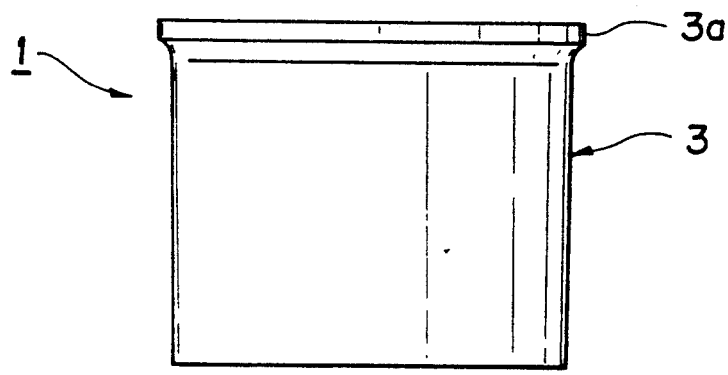
FIG. 3 is a side elevational view showing the filter element shown in FIG. 1.
Figure 4:
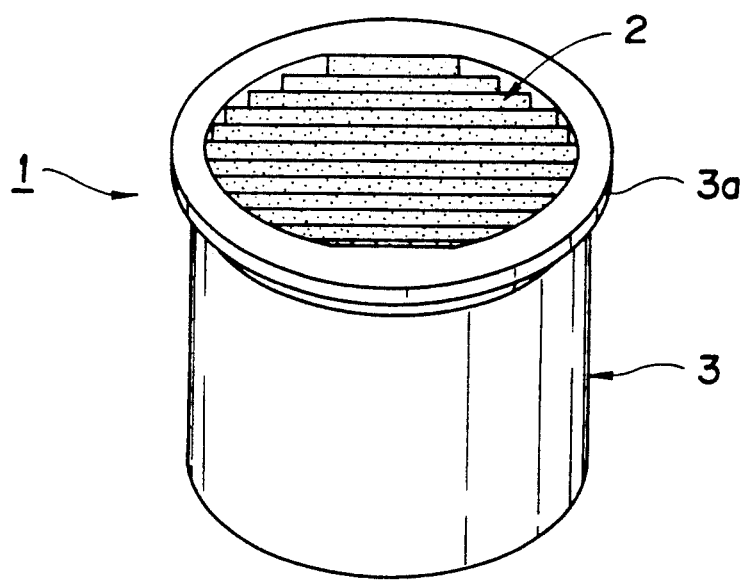
FIG. 4 is a perspective view showing the filter element shown in FIG. 1.
Figure 5:
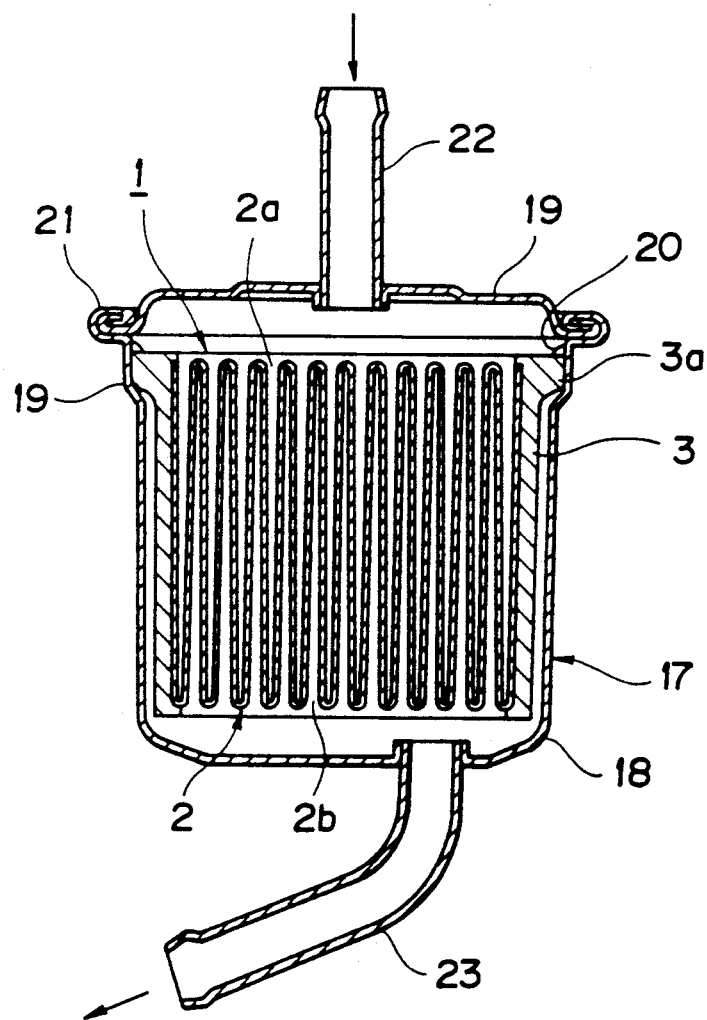
FIG. 5 is an elevational sectional view showing a fuel filter unit using the filter element shown in FIG. 1.

The filter element 1 is used as, for example, a fuel filter received in the case 17 for filtering the fuel such as gasoline as shown in FIG. 5.

The case 17 is separated into a body 18 and a cap 19. The body 18 has a hollow chamber for receiving the filter element 1 and a stepped portion at its upper portion for supporting the flange 3a. Adhesives 20 are made to flow over the upper portion of the flange 3a so that the filter element 1 is fixed in the interior of the body 18. Alternatively, without using the adhesives 20, it is also possible to adhere the filter element 1 to the body 18 by partially melting hot melt adhesives which form the circumferential wall 3 of the filter element. The cap 19 is mounted on the body 18 through a bent press portion 21 to thereby seal the interior of the body 18.

A fuel inlet pipe 22 is mounted at a central portion of the cap 19, and a fuel outlet pipe 23 is mounted on a bottom portion of the body 18.

The effect of the filter element 1 will be explained together with the effect of the fuel filter.

The fuel is caused to flow from the inlet pipe 22 to the case 17 toward the dust side of the zigzag filter material 2 of the filter element 1. Foreign matters such as dusts are removed from the fuel, and the cleaned fuel is passed through the filter material 2 to the bottom of the body 18. The fuel is picked up through the outlet pipe 23 to the outside of the fuel filter and is fed to a carburetor.

Figure 10:
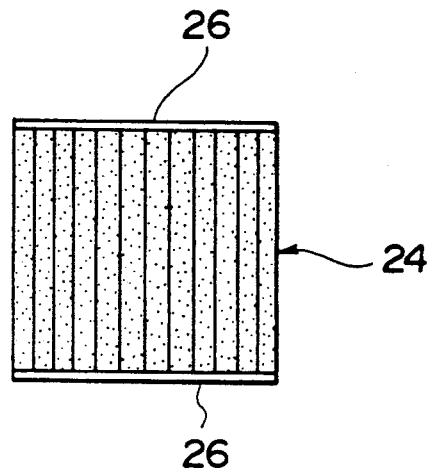
FIGS. 10A, 10B and 10C are plan views of filter elements according to other modifications, respectively.
Figure 10:
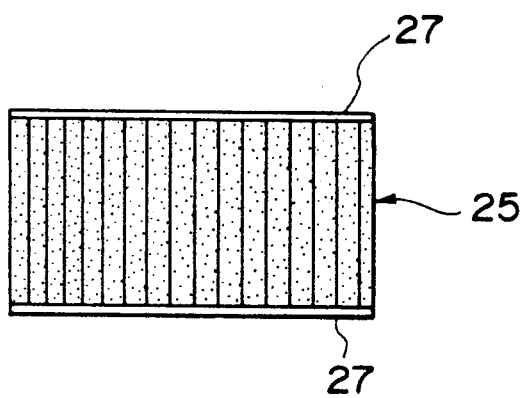
Figure 10:
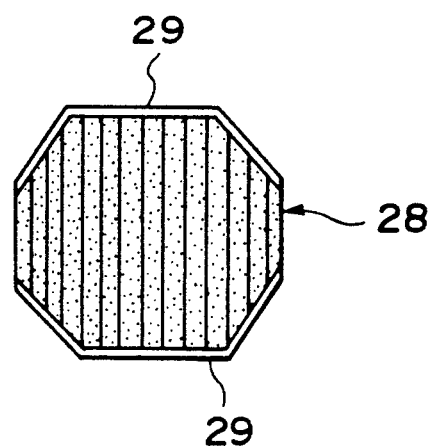
Figure 11:
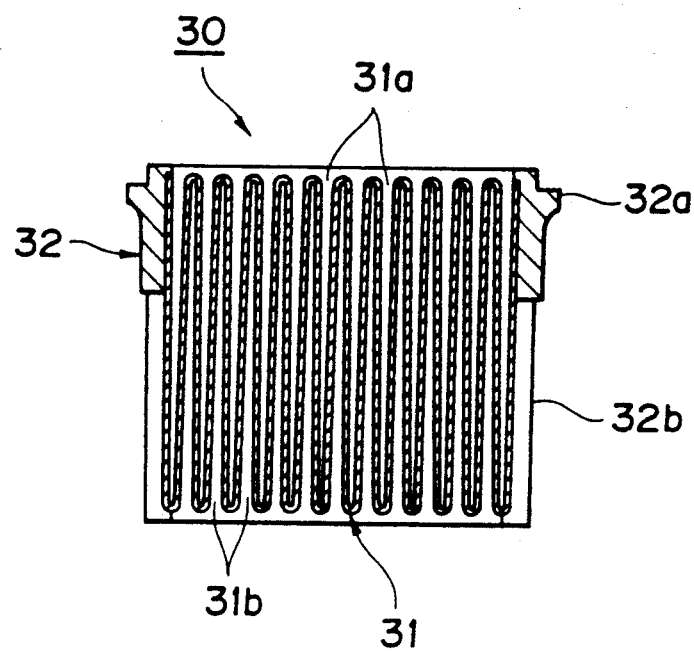
FIG. 11 is a cross sectional view taken along the line XI—XI of FIG. 12, showing a second embodiment of the filter element according to the invention.
Figure 12:
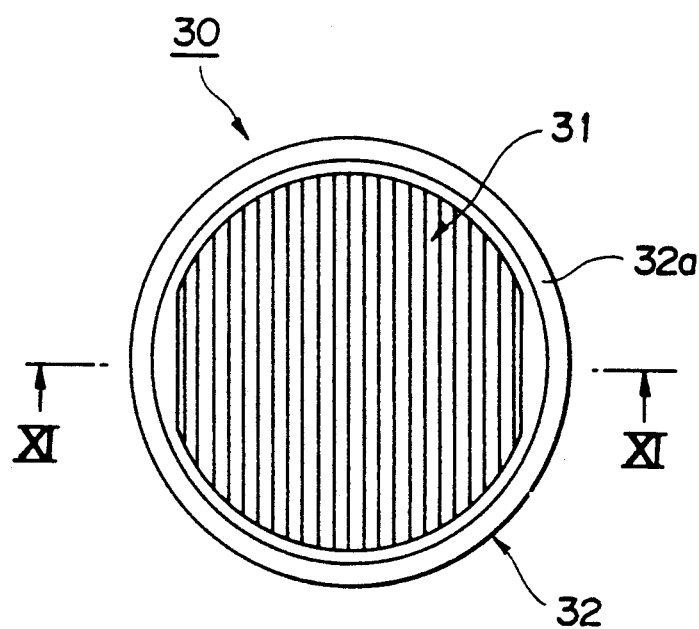
FIG. 12 is a plan view of the filter element shown in FIG. 11.
Figure 13:
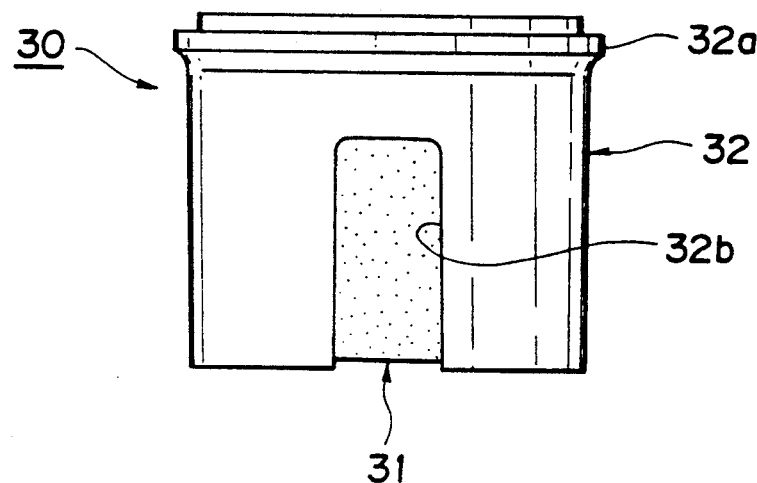
FIG. 13 is a side elevational view of the filter element shown in FIG. 11.
Figure 14:
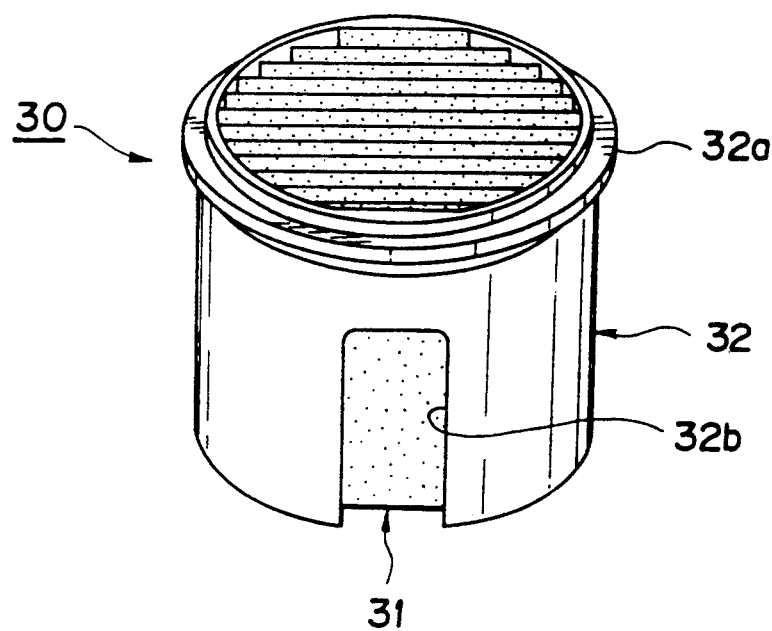
FIG. 14 is a perspective view of the filter element shown in FIG. 11.
Figure 15:
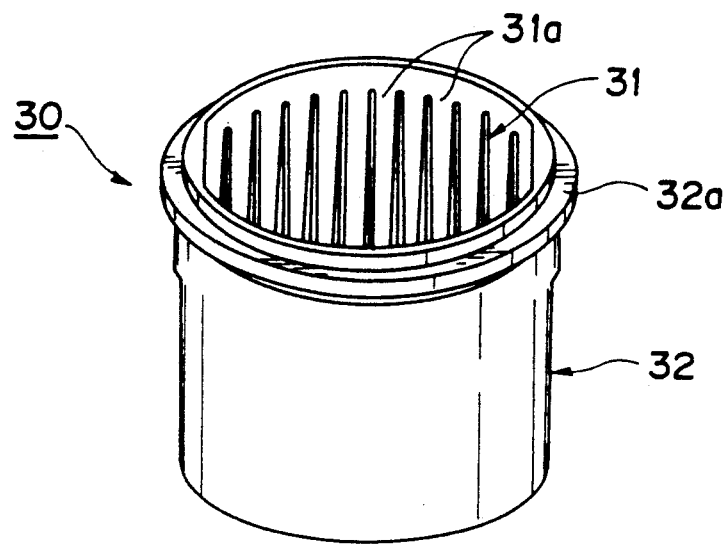
FIG. 15 is a perspective view of the filter element shown in FIG. 11, as viewed in a different direction.

Incidentally, the filter element 1 may be formed in various shapes as shown in FIGS. 10A, 10B and 10C.

The cubic or parallelepiped filter material 24 and 25 which has been obtained through the steps shown in FIG. 6 is used without any change. It is possible to use it by sealing the zigzag edge portions by the adhesives 26 and 27 (see FIGS. 10A and 10B). Also, it is possible to form an octagonal rod-shaped filter material by cutting the four corner portions of the above-described cubic filter material and to seal the zigzag edge portions with adhesive 29 (see FIG. 10C).

Embodiment 2

As shown in FIGS. 11 through 15, the filter element 30 has a filter material 31 folded in a zigzag manner and a fastening member for surrounding the filter material 31.

The filter material 31 is assembled by folding the sheet, which has a width smaller gradually toward the opposite ends as shown in FIG. 8, in a zigzag manner in a direction perpendicular to the longitudinal direction while keeping intervals between the folded portions. The contour of the filter material thus assembled is in the form of a cylinder. A number of grooves 31a and 31b are formed in the upper and lower portions of the filter material 31.

The filter material 31 may be formed of filter paper mainly composed of linter having, for example, a thickness of 0.65 mm, a weight per square area of 180 g/m$^2$ and a permeability of 4.8 sec/$\phi$mm·300 cc.

A fastening member 32 is formed of injection-molded resin as an adhesive into a substantially cylindrical shape for surrounding the outer periphery of the thus assembled filter material 31. The circumferential portion of the filter material 31 is embedded in the injection-molded resin in the same manner as that shown in FIG. 8. Also, the opposite ends are attached to the injection-molded resin. It is possible to use, for example, 6-nylon as an injection molded resin.

The filter material 31 fixed in the fastening member 32 is interposed therein in a zigzag manner in a vertical direction along the centerline of the fastening member 32.

The fastening member 32 has a flange 32a at its upper portion and a cutaway portion 32b (FIG. 14) at its lower portion. The flange 32a is used during the mounting work of the filter material in the case to be described later. The cutaway portions 32b are formed for exposing the filter material 31 as much as possible to increase the filtrating area.

The filter material 31 is formed integrally with the fastening member 32 simultaneously with the injection molding of the fastening member 32.

The manufacture method of the filter element 30 will be described.

Figure 44:
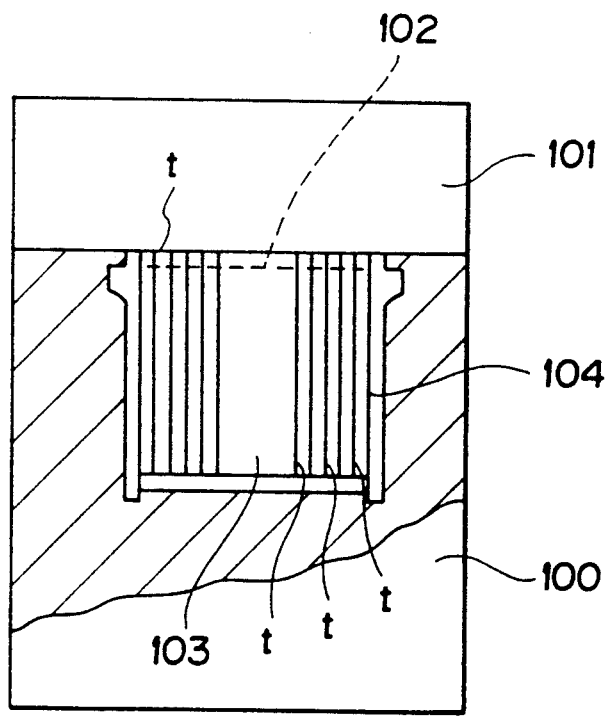
FIG. 44 is a partial sectional view of an injection molding die assembly.

First of all, the filter material 31 is mounted in molding dies 100, 101 shown in FIG. 44 for the injection molding under the condition shown in FIG. 8. The dies 100, 101 have two-divided comb-shaped tooth portions 102, 103 which are similar to the jig 14 shown in FIG. 7 and inserted into the grooves 31a and 31b of the filter material 31 so that the molten resin is not adhered to the filter surface of the filter material for holding, as shown in FIG. 8, the filter material. The dies 100, 101 also have die portions for forming around the two-divided comb-shaped tooth portions a cavity portion 104 inserted into the circumferential portion of the filter material 31 clamped by the two-divided comb-shaped tooth portions 102, 103. The die 103 has a tooth portion 102 and the die 101 has a tooth portion 103 whose teeth t are relatively inserted to each other while holding the cylindrical filter material 31. Also, the dies have die portions corresponding to the cutaway portions 32b.

The dies are clamped so as to clamp therebetween the filter material 31. Under this condition, the molten resin is injected into the molding dies 100, 101. The molten resin fills into the cavity portion 104 corresponding to the fastening member 32 to form the fastening member 32 which is adhered to the circumferential portion of the filter material 31. Thus, the filter material 31 is formed integrally with the fastening member 32.

Thereafter, the dies 100, 101 are opened, and the molded filter element 30 is removed therefrom.

Figure 16:
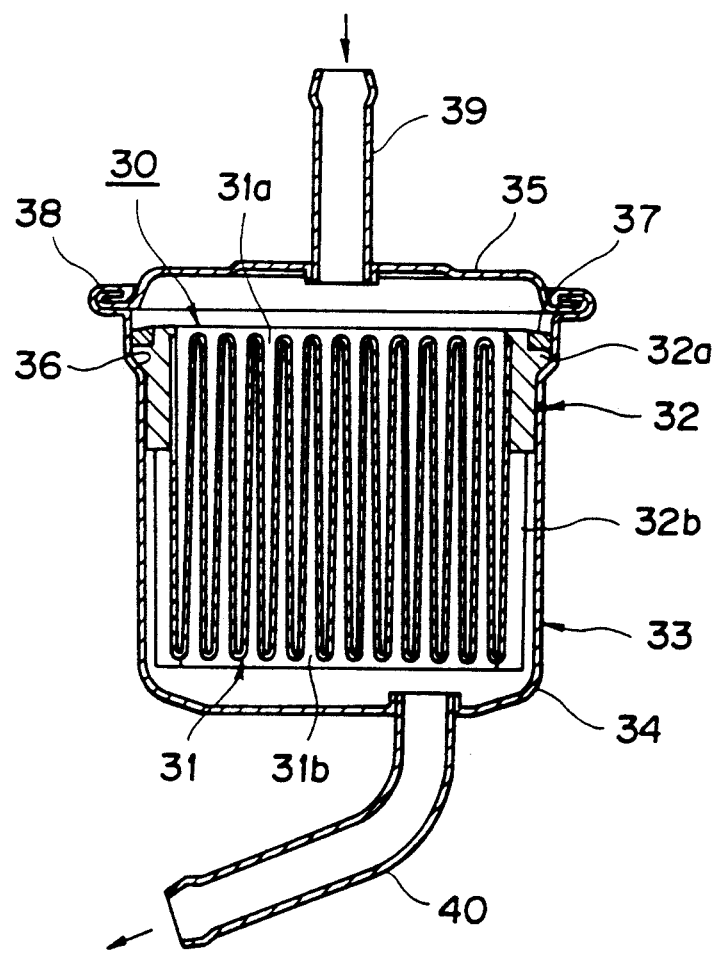
FIG. 16 is a side sectional view showing a fuel filter unit using the filter element shown in FIG. 11.

The thus formed filter element 30 is received in a case 33 as shown in, for example, FIG. 16 and is used as a fuel filter for filtrating fuel such as gasoline.

The case 33 is composed of a body 34 and a cap 35. The body 34 has a hollow chamber for receiving therein the filter element 30. The body 34 has, at its upper portion, a stepped portion for supporting the flange 32a. The adhesives 37 are caused to flow over the upper portion of the flange 32a so that the filter element 30 is fastened within the body 34. The cap 35 is mounted on the body 34 through turned-up portions 38 to thereby seal the body 34.

A fuel inlet pipe 39 is mounted at a central portion of the cap 35. A fuel outlet pipe 40 is mounted on a bottom portion of the body 34.

The effect of the filter element 30 will be explained together with the effect of the fuel filter.

The fuel is caused to flow from the fuel inlet pipe 39 to the case 33 and is introduced into the upward grooves 31a of the zigzag folded filter material 31 of the filter element 30. The fuel from which the foreign matters are to be removed is caused to pass through the filter material 31 and is introduced into the downward grooves 31b. The filtered fuel is caused to reach the bottom of the body 34 and is picked up through the outlet pipe 40 to the outside of the fuel filter to be fed to the carburetor.

The filter material 31 of the filter element 30 may be formed into various shapes as shown in FIGS. 17 to 20.

Figure 17:
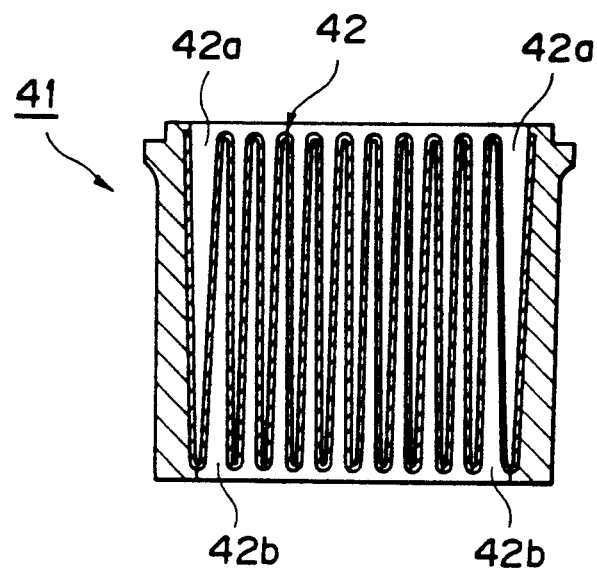
FIG. 17 is a side sectional view showing another modification of the filter element shown in FIG. 11.
Figure 18:
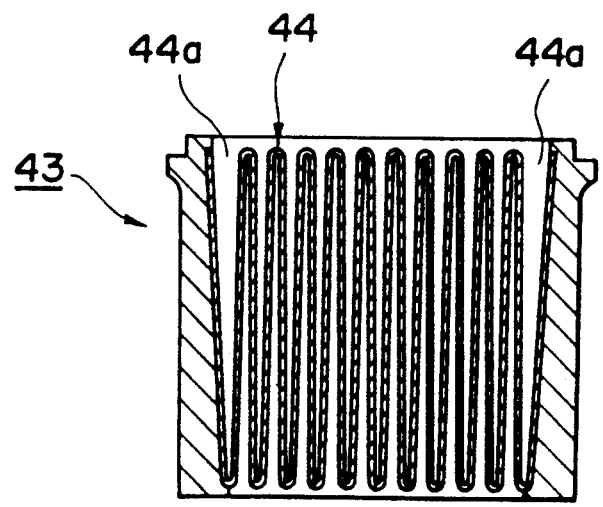
FIG. 18 is a side sectional view showing still another modification of the filter element shown in FIG. 11.
Figure 19:
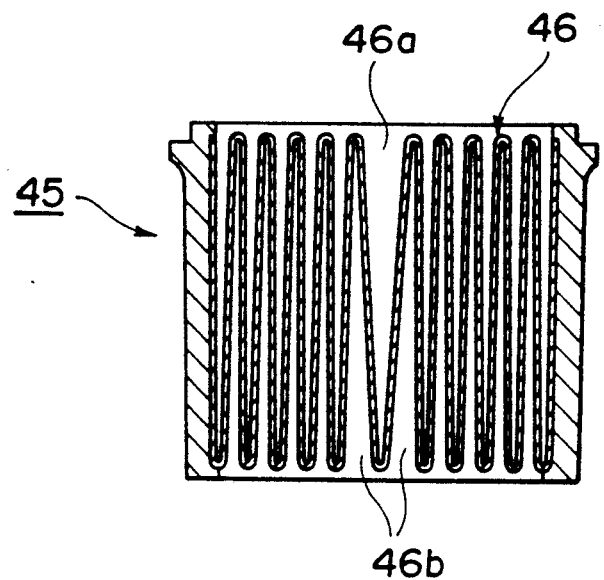
FIG. 19 is a side sectional view showing still another modification of the filter element shown in FIG. 11.
Figure 20:
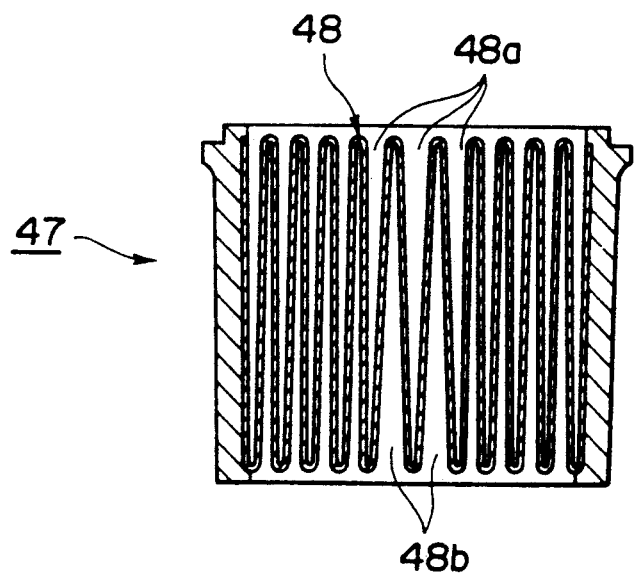
FIG. 20 is a side sectional view showing a further modification of the filter element shown in FIG. 11.

In a filter material 42 of a filter element 41 shown in FIG. 17, both end grooves 42a and 42b on the upper and lower sides of the element 41 are somewhat wider than the other grooves. In a filter material 44 of a filter element 43 shown in FIG. 18, both end grooves 44a on the upper side are somewhat wider than the other grooves. In a filter element 46 of a filter element 45 shown in FIG. 19, the upper central groove 46b and two lower central grooves 46a on both sides are somewhat wider than the other grooves. In a filter material 48 of a filter element 47 shown in FIG. 20, three central upper grooves 48a and two lower central grooves 48b are somewhat wider than the other grooves.

The fastening members for the filter elements 30, 41, 43 and 45 may be formed in various shapes as shown in FIGS. 21 to 24.

Figure 21:
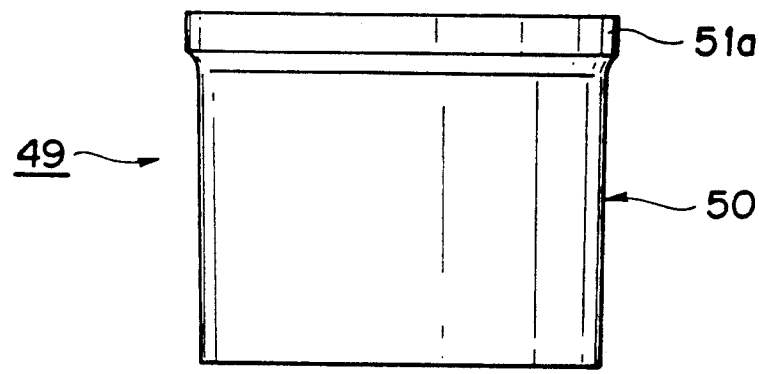
FIG. 21 is a side elevational view showing the filter element according to a modification of the invention.
Figure 22:
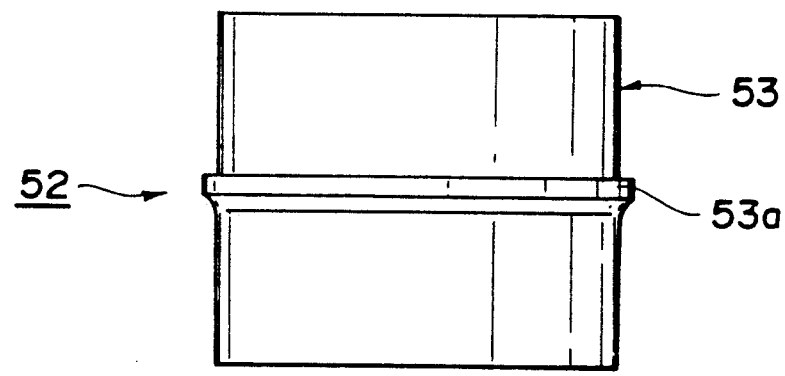
FIG. 22 is a side elevational view showing the filter element according to another modification of the invention.
Figure 23:
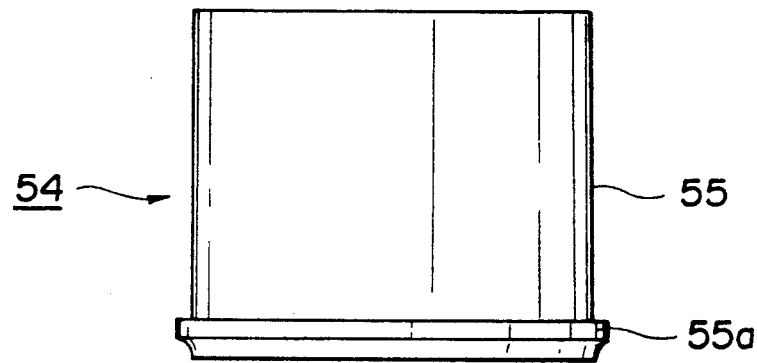
FIG. 23 is a side elevational view showing the filter element according to still another modification.
Figure 24:
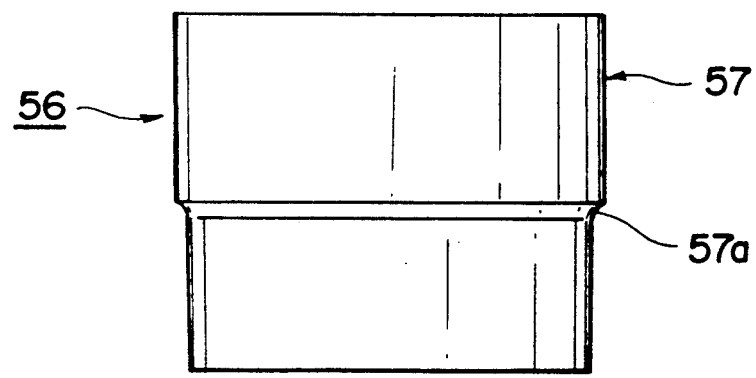
FIG. 24 is a side elevational view showing the filter element according to a further modification.
Figure 25:
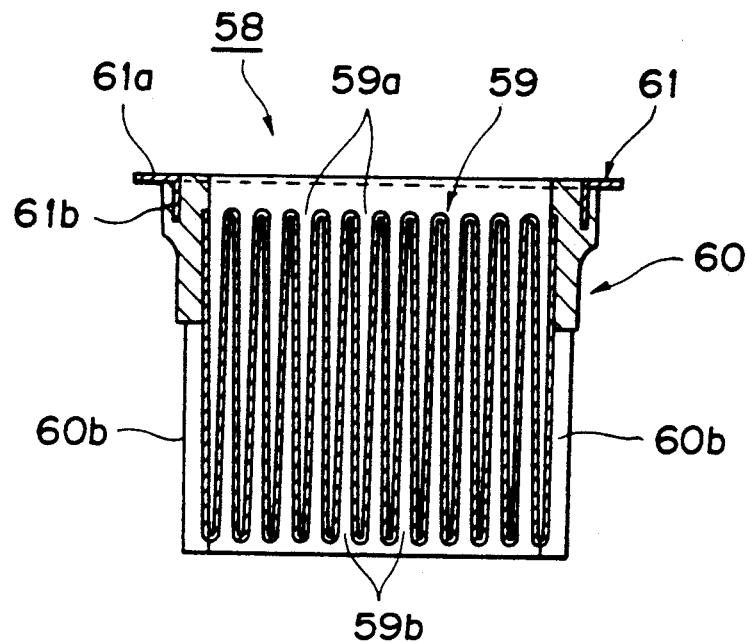
FIG. 25 is a cross sectional view taken along the line XXV—XXV of FIG. 26 showing a third embodiment of a filter element according to the invention.
Figure 26:
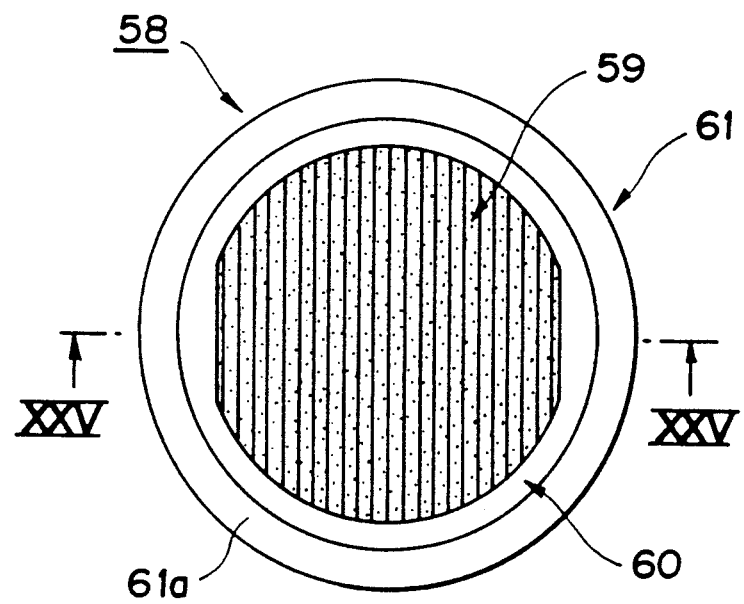
FIG. 26 is a plan view showing the filter element shown in FIG. 25.
Figure 27:
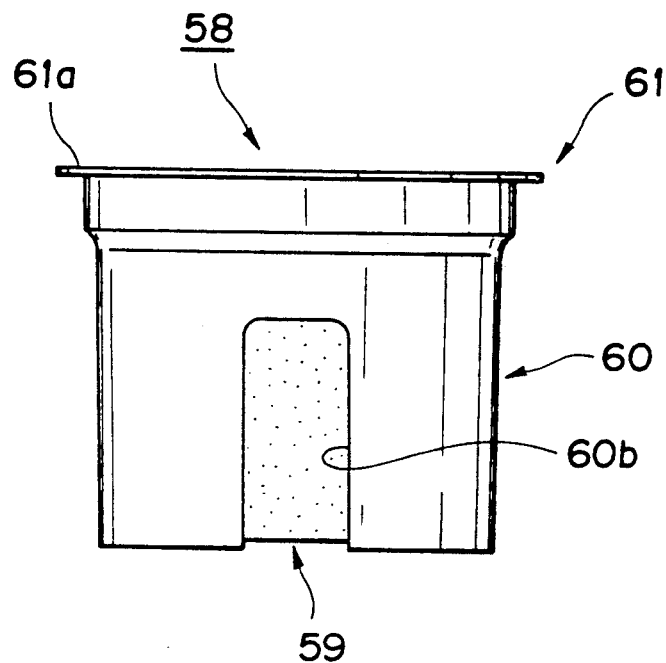
FIG. 27 is a side elevational view showing the filter element shown in FIG. 25.
Figure 28:
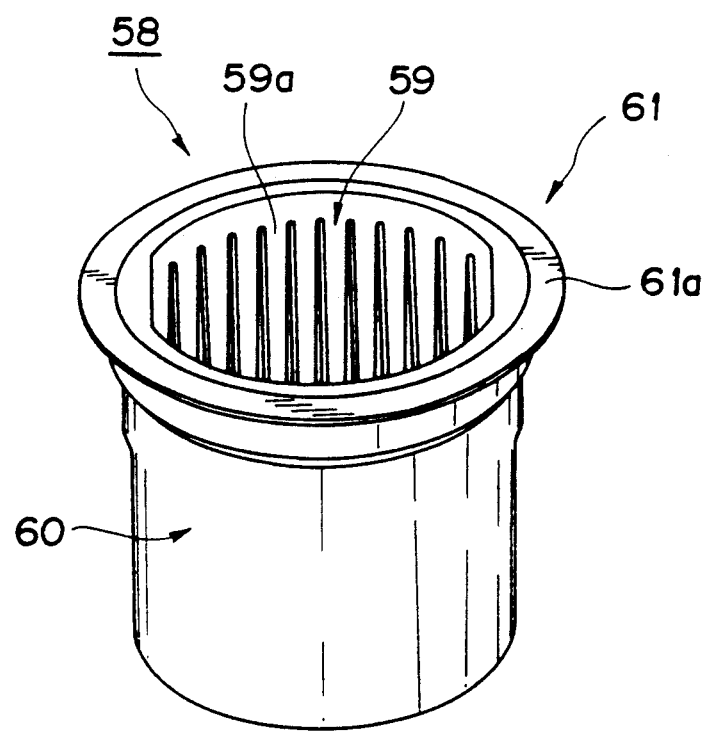
FIG. 28 is a perspective view showing the filter element shown in FIG. 25.
Figure 29:
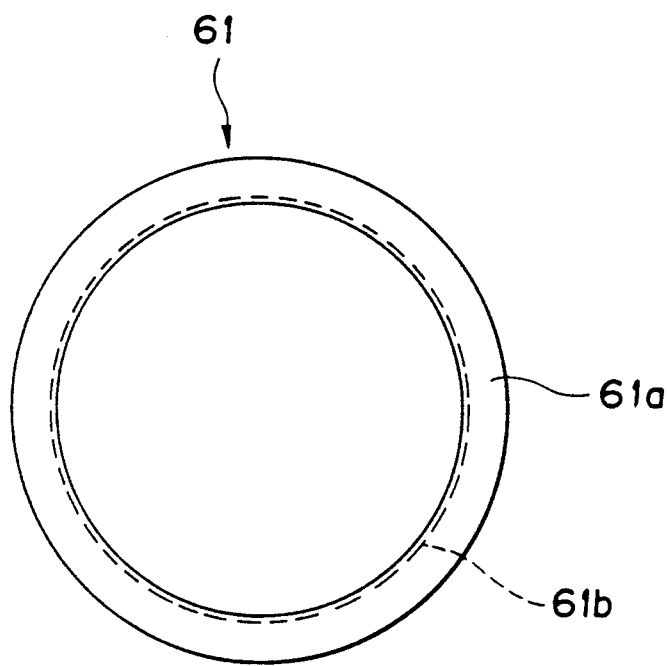
FIG. 29 is a plan view showing a coupling member used in the filter element shown in FIG. 25.
Figure 30:
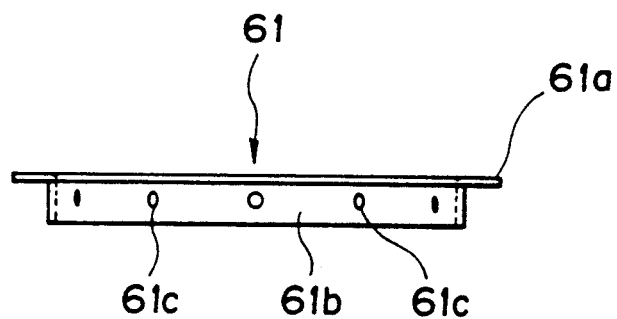
FIG. 30 is a side elevational view showing the coupling means for the filter element shown in FIG. 25.

The flange 51a of the fastening member 50 of the filter element 49 shown in FIG. 21 is provided at an upper end thereof. A flange 53a of the fastening member 53 of the filter element 52 shown in FIG. 22 is provided at an intermediate portion of the fastening member 53. A flange 55a of the fastening member 55 of the filter element 54 shown in FIG. 23 is provided at a bottom portion of the fastening member 55. In the fastening member 57 of the filter element 56 shown in FIG. 24, a stepped portion 57a is provided instead of the flange. The stepped portions 36 of the case 33 for receiving the filter elements 49, 52, 54 and 56 are formed corresponding to the positions of the flanges 51a, 53a and 55a and the stepped portion 57a.

Embodiment 3

As shown in FIGS. 25 through 31, the filter element 58 includes a zigzag folded filter material 59, a fastening member 60 as an adhesive (circumferential wall) for surrounding the outer periphery of the filter material 59, and a coupling member 61 made of metal for coupling the fastening member 60 to the case of the filter unit.

The filter material 59 is assembled in the same manner as that shown in FIG. 8 in which the sheet having a width smaller toward both end portions is folded in a zigzag manner in a direction perpendicular to the longitudinal direction with slight intervals therebetween.

Under the assembled state, the contour of the filter material 59 is in the form of a cylinder. A number of grooves 59a and 59b are formed in the upper and lower portions of the filter material 59.

The filter material 59 is made of filter paper mainly composed of linter having a thickness of 0.65 mm, a weight per square area of 180 g/m² and a permeability of 4.8 sec/φm·300 cc.

The fastening member 60 is injection-molded of resin substantially in the form of a cylinder for surrounding the filter material 59 thus assembled. The outer peripheral portion of the filter material 59 outside of the one dot and dash line is embedded in the injection-molded resin as an adhesive. The opposite ends of the filter material 59 are fixed to the injection-molded resin. It is possible to use 6 nylon as the injection-molded resin, for example.

The filter material 59 thus fixed to the fastening member 60 is interposed in the fastening member 60 in a zigzag manner along the center line of the fastening member 60.

Also, the fastening member 60 has, at its lower portion, cutaway portions 60b which are provided for exposing the filter material 59 as much as possible to thereby increase the filter area.

The filter material 59 is integrally formed with the fastening member 60 simultaneously with the injection molding of the fastening member 60 to thereby form the filter element 58.

The coupling member 61 has a flanged portion 61a extending in the form of a flange around the fastening member 60 and a cylindrical base portion 61b contiguous with an inner peripheral edge of the flanged portion 61a.

The cylindrical base portion 61b is embedded in a wall of an upper portion of the cylindrical fastening member 60. Holes 61c are formed at a constant pitch in the base portion 61b. The molten resin flows into the holes 61c to firmly couple the coupling member 61 to the fastening member 60. The base portion 61b is not formed within the wall of the fastening member 60 but may be mounted to be exposed to the outer surface of the fastening member 60.

The manufacture method of the filter element 58 will be explained.

The filter material 59 is mounted in the molding dies for injection molding under the condition as shown in FIG. 8. Simultaneously, the coupling member 61 is also mounted within the dies as shown in FIG. 44.

The dies have two-divided comb-shaped tooth portions inserted into the grooves 59a and 59b of the filter material 59 for holding the filter material as shown in FIG. 8 so that the molten resin is not adhered to the filter surface of the filter material 59. The dies have a die portion for forming a cavity portion, into which the peripheral edge portion 59c of the filter material 59 clamped by the two-divided comb-shaped tooth portion is inserted, around the two-divided comb-shaped tooth portions. The dies have mold portions corresponding to the cutaway portions 60b. Furthermore, the dies have mold portions for engaging with the flanged portion 61a of the coupling member 61 and supporting the coupling member 61 within the dies.

Subsequently, the dies are clamped to clamp therebetween the filter material and the molten resin is injected into the dies. Thus, the molten resin fills the cavity corresponding to the fastening member 60 to thereby form the fastening member 60 and simultaneously to adhere the fastening member 60 to the peripheral edge portion 59c of the filter material. Thus, the filter material 59 is formed integrally with the fastening member 60. Also, the molten resin is caused to flow so as to surround the base portion 61b of the coupling member 61 and embed the base portion 61b into the fastening member 60.

Thereafter, the dies are opened, and the formed filter element 58 is obtained.

Figure 31:
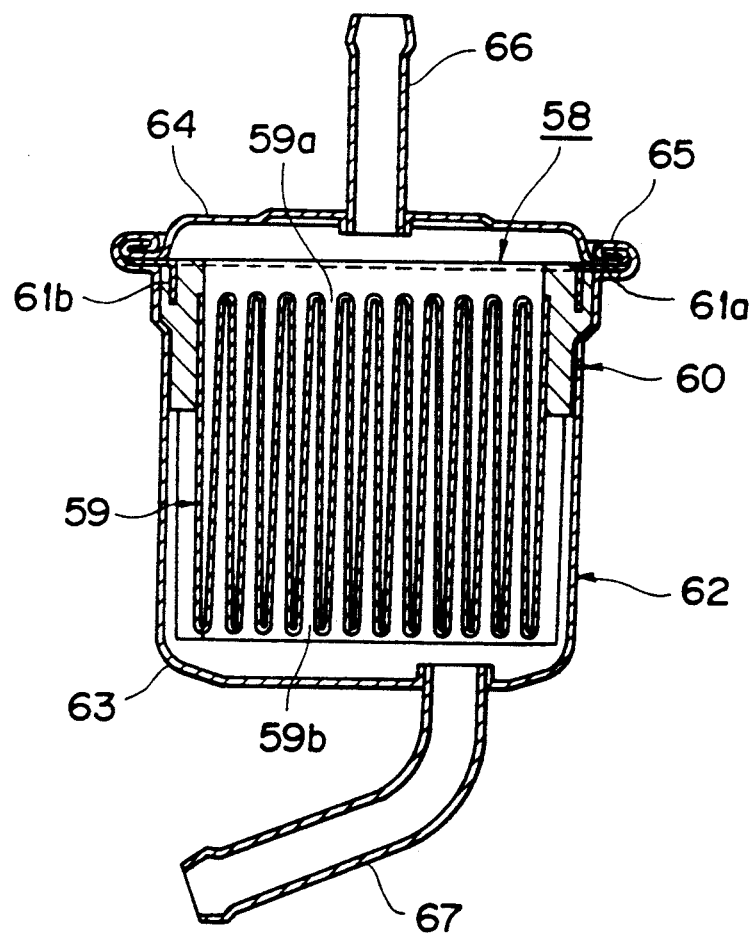
FIG. 31 is a sectional view showing a fuel filter using the filter element shown in FIG. 25.

The filter element 58 is received in a case 62 of the fuel filter for filtrating the fuel such as gasoline as shown in, for example, FIG. 31.

The case 62 has a body 63 and a cap 64. The body 63 has a hollow chamber for receiving the filter element 58. The filter element 58 is positioned at a predetermined position within the body 63 by placing the flanged portion 61a on an upper edge of the body 63. The cap 64 is provided from above. The peripheral edges of the body 63 and the cap 64 are wound up and pressed together so that a turn-up portion 65 is formed. Simultaneously with the formation of the turn-up portion, the flanged portion 61a is clamped in the turn-up portion 65.

Thus, the filter element 58 is formed integrally with the case 62 of the fuel filter.

A fuel inlet pipe 66 is formed in the central portion of the cap 64, and a fuel outlet pipe 67 is mounted on the bottom portion of the body 63.

Subsequently, the effect of the filter element 58 will be explained together with the effect of the fuel filter.

The fuel is caused to flow from the inlet pipe 66 to the case 62 and to be introduced into upward grooves 59a of the filter material 59 folded in a zigzag manner in the filter element 58. While the foreign matters such as dusts are being removed from the fuel, the fuel passes through the filter material 59 to the downward grooves 59b. The cleaned fuel is caused to reach the bottom of the body 63 and to be picked up through the outlet pipe 67 to the outside of the fuel filter to be fed to the carburetor.

The coupling member 61 for the filter element 58 may be formed in various shapes as shown in FIGS. 32 through 39.

Figure 32:
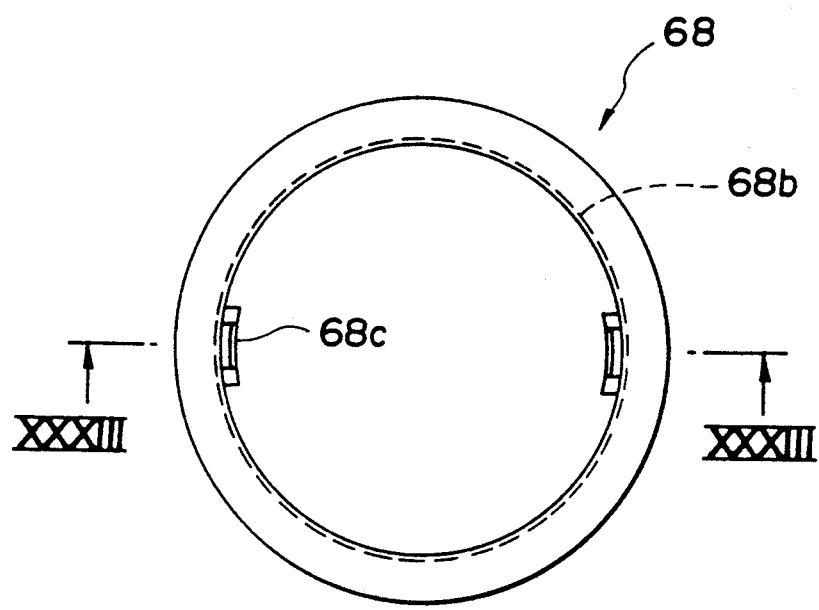
FIG. 32 is a plan view showing another coupling member.
Figure 33:
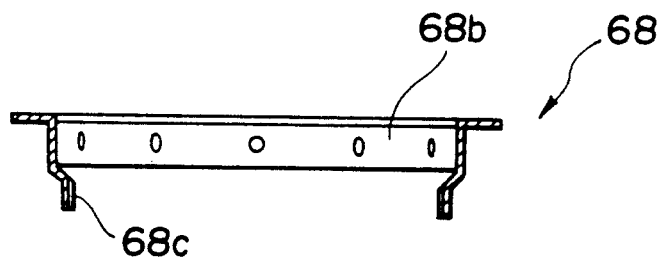
FIG. 33 is a side elevational view showing the coupling member shown in FIG. 32.
Figure 34:
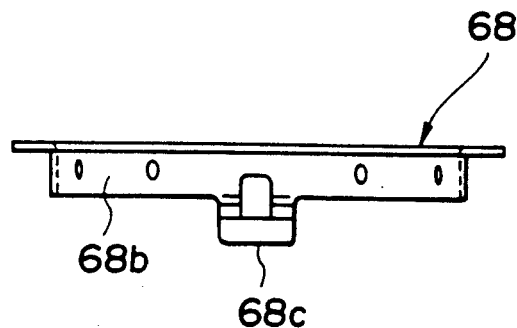
FIG. 34 is a side elevational view as viewed in a different direction from that of FIG. 33, showing the coupling member shown in FIG. 32.
Figure 35:
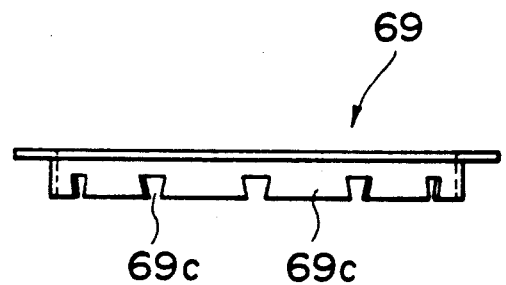
FIG. 35 is a side elevational view showing another coupling member.
Figure 36:
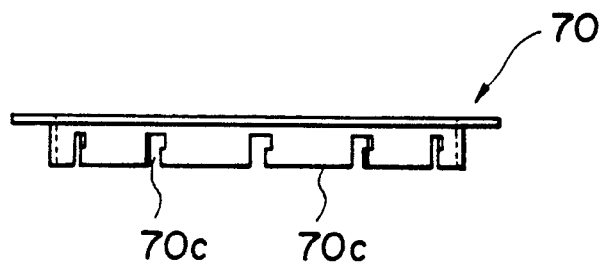
FIG. 36 is a side elevational view showing another coupling member.
Figure 37:
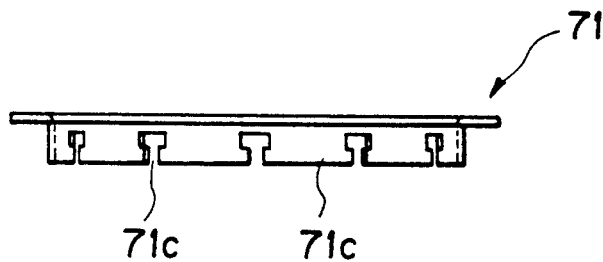
FIG. 37 is a side elevational view showing still another coupling member.
Figure 38:
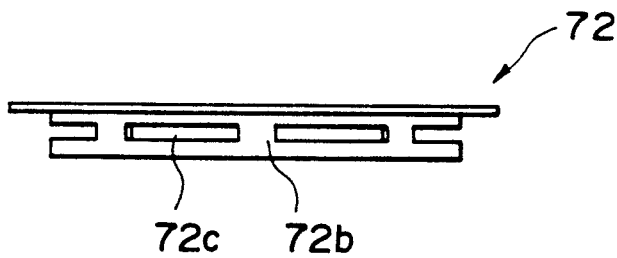
FIG. 38 is a side elevational view showing still another coupling member.
Figure 39:
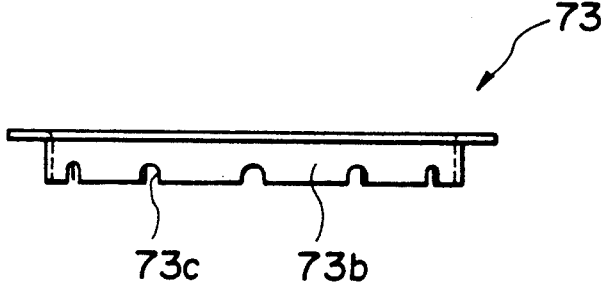
FIG. 39 is a side elevational view showing still another coupling member.

Projections 68c are formed in the base portion 68b of the coupling members 68 shown in FIGS. 32 to 34. The projections 68c are embedded in the resin of the fastening member 60 so that the coupling member 61 may be firmly fixed to the filter element 58. Dove-tail cutaway portions 69c are formed instead of the holes 61c in the base portion 69b of the coupling member 69 as shown in FIG. 35. In FIG. 36, instead of the holes 61c, hook shaped cutaway portions are formed in the base portion 70b of the coupling member 70. In FIG. 37, mushroom-shaped holes are formed in the base portion 71b of the coupling member 71. In FIG. 38, rectangular holes instead of the holes 61c are formed in the base portion 72b of the coupling member 72. In FIG. 39, cutaway portions 73c are formed in the base portion 73b of the coupling member 73 so that their circular holes are intersected with the edge portions of the base portion 73b.

Figure 40:
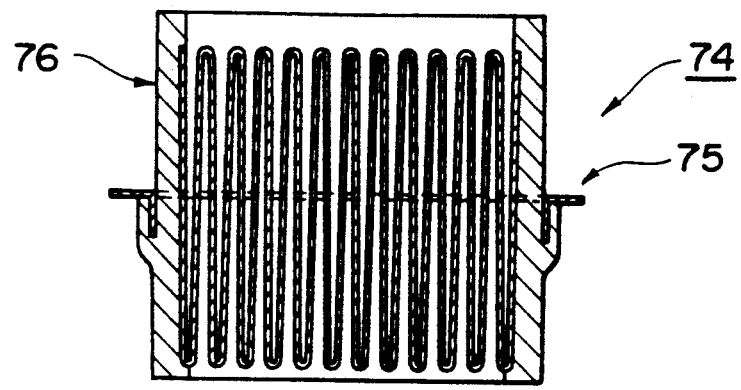
FIG. 40 is a sectional view showing the filter element according to a modification.
Figure 41:
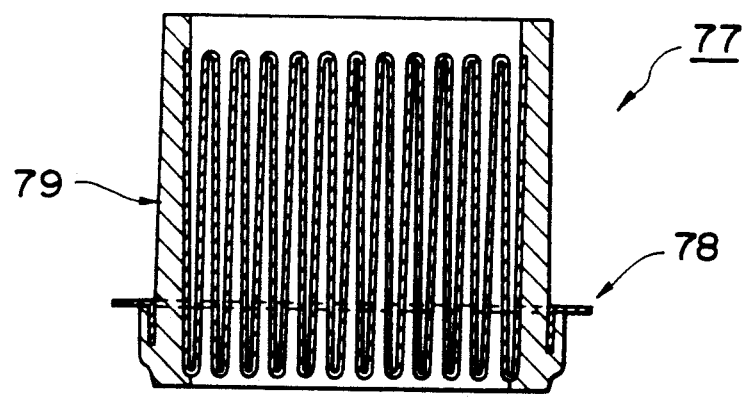
FIG. 41 is a sectional view showing the filter element according to another modification.

The coupling member may be positioned at positions as shown in FIGS. 40 and 41.

The coupling member 75 for the filter element 74 shown in FIG. 40 is provided in the middle portion of the fastening member 76. The coupling member 78 for the filter element 77 shown in FIG. 41 is provided at a lower portion of the fastening member 79.

Figure 42:
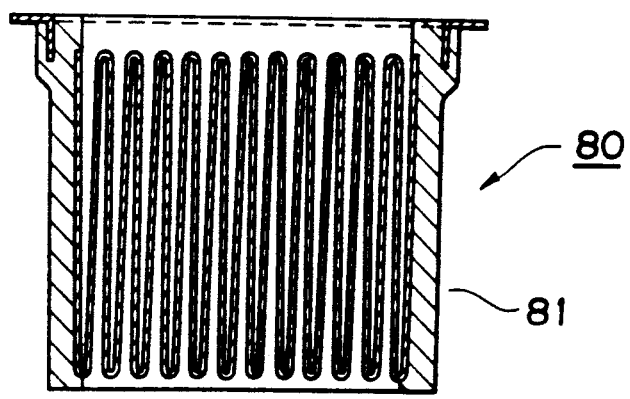
FIG. 42 is a sectional view showing the filter element according to still another modification.

The fastening member 81 for the filter element 80 may dispense with the cutaway portions 60b as shown in FIG. 42.

Although the filter elements 1, 30, 41, 43, 45, 47, 49, 52, 54, 56, 58, 74, 77 and 80 of the respective embodiments are explained as those used for filtering the fuel, it is apparent that the filter elements may be used for filtering any other fluid such as oil and air. In the filter elements according to the present invention, as described above, the zigzag end portions of the zigzag folded filter material is sealed with adhesives so that the filter material is divided into the dust side and the clean side. Accordingly, the pitch of the zigzag folds becomes small, and it is possible to enhance the filter performance. Also, since the adhesive are used for adhesion of the zigzag end portions of the filter material, it is possible to reduce the number of parts and to simplify the structure of the filter elements.

Also, in the case where the fastening member is formed of the injection-molded resin, the fastening member is adhered to the filter material upon the melting operation. It is therefore unnecessary to use other adhesives for coupling the fastening member and the filter material. Accordingly, any extra adhesive is not protruded from the coupling portion so that it is possible to increase the filter area. Also, since it is possible to integrally form the fastening member and the filter material into one piece assembly upon the molding step of the fastening member, it is possible to simplify the assembling steps of the filter element and to reduce a manufacture cost.

In the case where the fastening member is formed of the injection-molded resin kept under a molten state and the base portion of the coupling member and the circumferential edge portion of the filter material are embedded in the fastening member during the molten state, it is possible to adhere the three components, i.e., the fastening member, the filter material and the coupling member together without other adhesive. Accordingly, there is no fear that the surface of the filter material is contaminated by the adhesive. Also, it is possible to simplify the assembling work. Also, since it is possible to separately manufacture the coupling member and the fastening member, it is possible to readily produce the coupling member.

In the manufacture method of the filter element according to the invention, since the filter material is folded in a zigzag manner and subsequently the zigzag end portions of the folded filter material are sealed with adhesive so that the filter material is divided into the dust side and the clean side, it is easy to assemble the filter element and to divide the filter material into the dust side and the clean side.

According to another method of the invention, since the adhesive is applied to both the end portions of the sheetlike filter material and subsequently, the filter material is folded in a zigzag manner so that the zigzag end portions are sealed with adhesive to separate the filter material into the dust side and the clean side, the adhesion is stable and it is easy to divide the filter element into the dust side and the clean side.

What is claimed is:

1. A filter element, comprising:
   a) a filter material having a plurality of end portions and being folded in a zigzag manner; and
   b) a circumferential wall for fixing and surrounding the end portions, said circumferetial wall being formed of adhesive integrally with the end portions, said circumferential wall having at least one cutaway portion, said cutaway portion being opposed to each of opposite end portions of the filter material, to thereby expose the end portion of the filter material to outside of the filter element.

2. A filter element according to claim 1, wherein said adhesive is hot melt adhesive composed mainly of polyester resin.

3. A filter element according to claim 1, wherein said adhesive is formed of thermo-setting or thermoplastic expoxy resin.

4. A filter element according to claim 1, wherein said adhesive is formed of injection-molded resin.

5. A filter element according to claim 1, wherein said circumferential wall has a flange portion at its upper or lower end or at its intermediate portion thereof.

6. A filter element according to claim 1, wherein both end grooves in a radial direction thereof on the upper and lower sides of the filter element are somewhat wider than the remaining grooves.

7. A filter element according to claim 1, wherein an upper central groove and two lower central grooves on both sides in a radial direction of the filter element are somewhat wider than the remaining grooves.

8. A filter element according to claim 1, wherein an upper central groove and two lower central grooves of the filter element are somewhat wider than the outer remaining grooves.

9. A filter element to claim 1, wherein three central upper grooves and two lower central grooves are somewhat wider than the other remaining grooves.

10. A filter element to claim 1, wherein a coupling member for coupling the filter element to a case of a filter unit is embedded integrally at a periphery of the circumferential wall.

11. A filter element according to claim 10, wherein the coupling member is made of metal.

12. A filter element to claim 11, wherein the coupling member has at least one projection or hole for firmly fixing it to the circumferential wall.

* * * * *